Jan. 18, 1955     E. C. ELSNER     2,699,587
COUPLED FITTING
Filed June 14, 1951
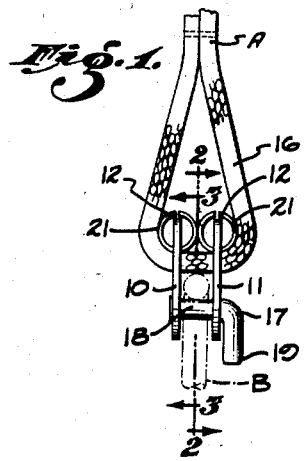
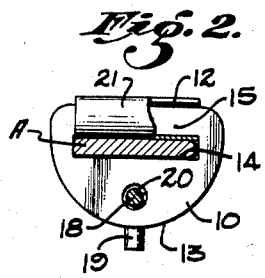
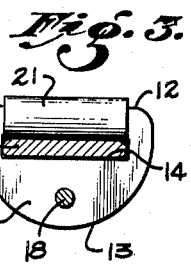
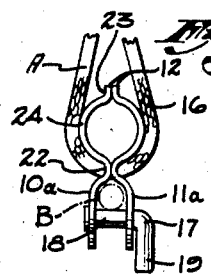
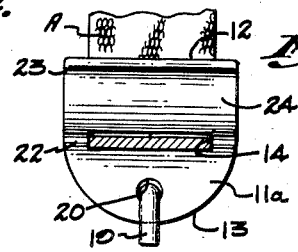
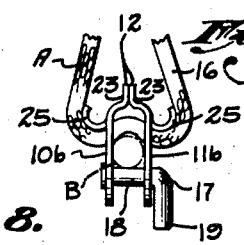
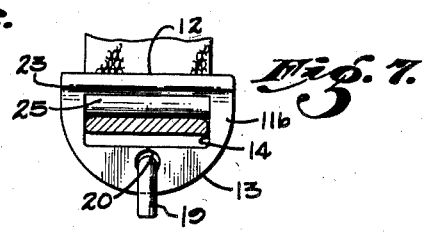
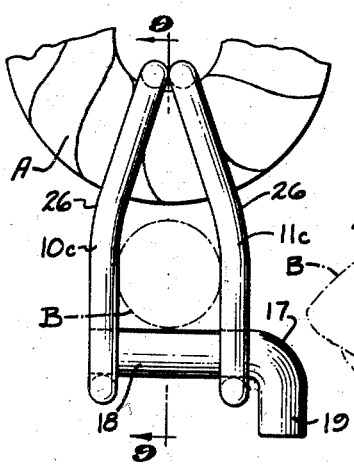
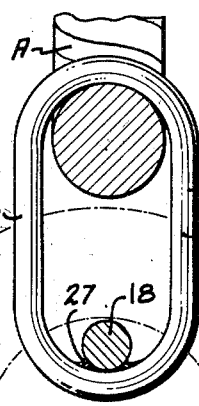
EDWIN C. ELSNER,
INVENTOR.
BY
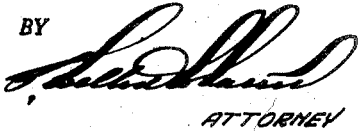
ATTORNEY Patented Jan. 18, 1955

2,699,587

COUPLED FITTING

Edwin C. Elsner, Glendale, Calif.

Application June 14, 1951, Serial No. 231,640

1 Claim. (Cl. 24—123)

The present invention relates generally to a connecting device, and is more particularly concerned with a coupled fitting having general application, and which is especially useful for releasably interconnecting ropes and cables, anchoring tie-down members and the like.

It is one object of the present invention to provide a fitting of the character described in which the fitting parts are maintained and held in interconnected coupled relation by the tension forces exerted on the members with which the fitting is utilized, and which can not be uncoupled or released until the tension forces are withdrawn.

A further object is to provide a fitting for interconnecting of two rope members, cable members or a flexible member and rigid member such as a deck or floor ring, wherein novel construction of parts permits interconnection in close coupled relation.

A still further object is to provide a fitting of this character which is so constructed that the interconnected members will not be subjected to crushing forces, when placed under tension stresses.

Further objects of the invention will be brought out in the following part of the specification, wherein detailed description is for the purpose of fully disclosing several embodiments of the invention without placing limitations thereon.

Referring to the accompanying drawings, which are for illustrative purposes only:

Fig. 1 is a side elevational view of one embodiment of the present invention;

Fig. 2 is a sectional view taken substantially on line 2—2 of Fig. 1;

Fig. 3 is a sectional view taken substantially on line 3—3 of Fig. 1;

Fig. 4 is a modified construction of the invention, as shown in side elevation;

Fig. 5 is a front elevational view of the same, a portion being shown in section for clarity;

Fig. 6 is a side elevational view of another modification of the invention;

Fig. 7 is a front elevational view of the same, a portion being shown in section for clarity;

Fig. 8 is still another modification, as it appears in side elevation; and

Fig. 9 is a sectional view taken substantially on line 9—9 of Fig. 8.

Referring now to the drawings, for illustrative purposes, the coupled fitting of the present invention is disclosed as being utilized for releasably interconnecting a flexible member A with a member B which may be of rigid material. The member A, for example, may consist of a webbing material as shown in Fig. 1, or may consist of a cable or rope such as shown in Fig. 8. The member B, for example, may comprise a deck ring or similar element of rigid material as shown in Fig. 1, or it might comprise a cable or rope, as shown in dotted line in Fig. 8, where rope sections are to be interconnected.

As shown more specifically in Fig. 1, the fitting comprises a pair of confronting links 10 and 11 having similar configuration. These links are constructed of suitable rigid material, and may be stamped or otherwise formed from a suitable metal. Each link is in general of semi-circular plate construction with a straight edge 12 on one side and a curved edge 13 on its other. Spaced from the edge 12 is an elongate opening 14 which is so positioned that a first bridging portion 15 results along the straight side of the link, and a second bridging portion 15' results along the curved edge 13.

The flexible member A is shown as being formed into a loop 16 which is threaded through the registered, aligned openings 14—14 of the links 10 and 11, with opposite sides of the loop extending around the adjacent ends containing the bridging portion 15—15 of the links.

At the other adjacent ends of the cooperatively associated links, the links are releasably interconnected by means of a hook member 17 having a shank portion 18 which is secured to one of the links, link 10 in this instance, and a deflected end portion 19 which is adapted to be inserted through an opening 20 formed in the other link member.

The fitting as thus far described may be connected with the member B, by first spreading the loop 16 sufficiently far apart to permit the member B to be inserted over the shank portion 18 of the hook member 17. By canting the link members into angularly disposed relation to each other, the deflected end 19 of the hook member may be inserted into the opening 20 and slidably moved thereover so as to bring the links 10 and 11 into confronting relation with the member B positioned therebetween and extending over the shank portion 18 which now forms a keeper or retainer. It will be apparent that if tension were now placed on the flexible member A, the forces at the bottom of the loop would force the bridging portions 15 of the associated links together so that there would be a gripping or crushing force exerted on the member B where it passes between the links over the shank portion 18. This obviously is objectionable, and in order to overcome this problem, the present invention has eliminated the crushing forces by providing a roller 21 for each link, this roller being formed from a flat sheet and shown as being longitudinally split. Each roller surrounds a bridging portion 15 and extends through the opening 14 so as to form rounded surfaces for engaging the opposite sides of the loop 16. Moreover, the forces which tend to collapse the loop, when the tension is applied to the flexible member will act to move the confronting faces of the rollers into abutting engagement, as shown in Fig. 1, thus leaving the links 10 and 11 free to accommodate themselves without transmitting crushing forces to member B. It will be apparent that the bridging portions 15, when tension forces are applied to the flexible member A will be moved due to the curvature of the inner surface of the rollers so as to occupy positions centrally of the rollers. The utilization of rollers 21, as just described, also eliminates sharp edges which would have a tendency to cut into the surface of the flexible member and in time would cause undesirable wear and decrease of strength. The outer surfaces of the rollers provide curved surfaces over which the flexible material will ride.

The embodiments shown in Figs. 4, 6, and 8 operate generally in the same manner as the embodiment disclosed in Fig. 1, but differ as to certain details of construction which will now be described. Similar parts corresponding to those contained in the embodiment of Fig. 1, will be referred to by similar numerals.

In the embodiment shown in Fig. 4, it will be observed that the opening 14 is spaced a greater distance from the edge 12, than shown in Fig. 1. However, the major distinction resides in the configuration of the links 10a and 11a in their end portions adjacent to the opening 14 and the portion lying between this opening and the edge 12. More specifically, the plates are inwardly curved to form a longitudinal depression 22 substantially in alignment with the opening 14, and adjacent the edge 12 in each case there is provided edge portions 23. The area of each link lying between the depression 22 and edge portion 23 is outwardly curved to form a substantially semicircular or semi-circular surface 24. As thus formed, the depressions 22 and edge portions 23 provide abutments for the confronting links, and the curved surfaces 24 engage the opposite sides of the loop 16 which is carried over the adjacent end portions of the links. The compressive forces tending to collapse the loop 16 are thus applied to the cooperatively formed cylinder, when tension is applied to flexible member A. With this arrangement compressive forces are prevented from being transmitted against the member B in the same manner as previously described.

In the construction shown in Fig. 6, the links 10b and 11b are deflected adjacent their edges 12—12 so as to similarly form abutment edge margins 23—23 as in the case of the embodiment shown in Fig. 4. In this construction, however, the material which is cut along one edge and two ends to form the opening 14, is outwardly deflected to form a transversely curved elongate lip 25 on each link for engaging opposite sides of the loop 16, when assembled as shown in Fig. 6.

In the embodiment shown in Fig. 8, closed links 10c and 11c of elliptical construction, similar to chain links, are utilized. In this embodiment, the links are bent substantially midway between their ends at points generally indicated by numeral 26, in order to converge one set of ends and bring their end termini into abutment. In this arrangement, the flexible member A is trained through the confronting links around the abutting ends. The other end portions of the links are disposed in substantially parallel relation so that crushing forces will not be exerted against the associated member B which extends between the links and over the shank 18 of the hook 17. In this case, the shank 18 is bonded as by welding 27 to one of the opposite ends of the associated links, in this case link 10c.

Various other modifications may suggest themselves to those skilled in the art without departing from the spirit of my invention, and, hence, I do not wish to be restricted to the specific forms shown or uses mentioned, except to the extent indicated in the appended claim.

I claim:

In a device of the character described: a pair of links, each having an opening between a first bridging portion at one end and a second bridging portion at its opposite end, said links being positionable in confronting relation with their openings aligned and their corresponding first and second bridging portions adjacent; tubular rollers loosely mounted on the adjacent first bridging portions adapted for roller engagement with a flexible member looped through said aligned openings and upon the application of tension forces to said loop to move the rollers to an abutment position with the links spaced apart with their first bridging portions free to accommodate themselves within their associated rollers independently of the forces applied on the rollers; a projecting hook member anchored to the second bridging portion of one of said links and having an outer end adapted to engage the adjacent second bridging portion of the other link, so as to form a supporting bar for a member placed over the hook between the links and limit outward movement of the associated second bridging portions, but upon release of tension forces on said loop enable separating of the rollers and relative movement of the links to disengage the outer end of the hook, whereupon the links may be separated and the member associated with the hook removed over the hook end.

References Cited in the file of this patent

UNITED STATES PATENTS

| Number | Name | Date |
|---|---|---|
| 236,031 | Hookham | Dec. 28, 1880 |
| 468,537 | Porter | Feb. 9, 1892 |
| 598,526 | Lott | Feb. 8, 1898 |
| 653,843 | Coleman | July 17, 1900 |
| 986,362 | Cohen | Mar. 7, 1911 |
| 1,044,302 | Underhill | Nov. 12, 1912 |
| 1,064,413 | Winn | June 10, 1913 |
| 1,227,168 | Matthews | May 22, 1917 |
| 1,338,850 | Bear | May 4, 1920 |
| 1,449,765 | McLaughlin | Mar. 27, 1923 |
| 1,681,378 | Steinmayer | Aug. 21, 1928 |
| 1,821,239 | Scott | Sept. 1, 1931 |

FOREIGN PATENTS

| Number | Country | Date |
|---|---|---|
| 9,663 | Great Britain | 1884 |
| 128,523 | Switzerland | Oct. 19, 1926 |